United States Patent
Takahashi et al.

(10) Patent No.: US 10,011,752 B2
(45) Date of Patent: Jul. 3, 2018

(54) PRODUCTION METHOD FOR POLISHING-MATERIAL PARTICLES

(71) Applicant: KONICA MINOLTA, INC., Chiyoda-ku (JP)

(72) Inventors: Atsushi Takahashi, Musashino (JP); Natsuki Ito, Hachioji (JP); Keisuke Mizoguchi, Hachioji (JP); Akihiro Maezawa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 23 days.

(21) Appl. No.: 14/426,071

(22) PCT Filed: Sep. 3, 2013

(86) PCT No.: PCT/JP2013/073640
§ 371 (c)(1),
(2) Date: Mar. 4, 2015

(87) PCT Pub. No.: WO2014/038536
PCT Pub. Date: Mar. 13, 2014

(65) Prior Publication Data
US 2015/0232728 A1    Aug. 20, 2015

(30) Foreign Application Priority Data

Sep. 5, 2012  (JP) .................................. 2012-194691

(51) Int. Cl.
*C09K 3/14* (2006.01)
(52) U.S. Cl.
CPC .................. *C09K 3/1445* (2013.01)

(58) Field of Classification Search
CPC .................................................. C09K 3/1445
See application file for complete search history.

(56) References Cited

U.S. PATENT DOCUMENTS

2003/0186634 A1  10/2003  Nishida et al.
2004/0154230 A1   8/2004  Wang

FOREIGN PATENT DOCUMENTS

CN    101555387        10/2009
CN    101555387    *    8/2012
(Continued)

OTHER PUBLICATIONS

B. Aiken et al., "Preparation and Properties of Monodispersed Colloidal Particles of Lanthanide Compounds: III, Ytrirum (III) and Mixed Ytrrium (III)/Cerium (III) Systems", Journal of American Society, vol. 71, No. 10, pp. 845-853, 1988.

*Primary Examiner* — Shuangyi Abu Ali
(74) *Attorney, Agent, or Firm* — Cozen O'Connor

(57) ABSTRACT

A production method for polishing-material particles, comprising: forming an inner layer having, as a main component thereof, a salt of at least one element selected from Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and the alkali earth metals; adding a prepared aqueous solution, at a prescribed time, to a reaction solution in which the salt formed from the element is dispersed, to form an outer layer on the outer side of the inner layer; using solid-liquid separation to separate a polishing-material-particle precursor from the reaction solution, and the polishing-material-particle precursor is baked; and the percentage of Ce in the reaction solution in which the surface of the outer layer is formed is in the range of 60-90 mol % inclusive.

3 Claims, 6 Drawing Sheets

(56) References Cited

FOREIGN PATENT DOCUMENTS

| | | |
|---|---|---|
| JP | 2002-356312 | 12/2002 |
| JP | 2003-277732 | 10/2003 |
| JP | 2004-2723 | 1/2004 |
| JP | 2008-13716 | 1/2008 |
| JP | 2012-11525 | 1/2012 |
| JP | 2012-11526 | 1/2012 |
| WO | WO 2005/035688 | 4/2005 |
| WO | WO 2010/139603 | 12/2010 |
| WO | WO 2012/101871 | 8/2012 |

* cited by examiner

PRODUCTION METHOD FOR POLISHING-MATERIAL PARTICLES

RELATED APPLICATIONS

This is a U.S. National Phase Application under 35 USC 371 of International Application PCT/JP2013/073640 filed on Sep. 3, 2013.

This application claims the priority of Japanese application no. 2012-194691 filed Sep. 5, 2012, the entire content of which is hereby incorporated by reference.

TECHNICAL FIELD

The present invention relates to a method of producing a polishing material particle.

BACKGROUND ART

In precision polishing in process of producing glass optical elements, glass substrates, and semiconductor devices, polishing materials composed of oxides of rare earth elements, mainly composed of cerium oxide and additionally containing lanthanum oxide, neodymium oxide, praseodymium oxide, and/or oxides of other rare earth elements, have been traditionally used. Although other polishing materials, for example, diamond, iron oxide, aluminum oxide, zirconium oxide, and colloidal silica are also known, cerium oxide has been widely used from the viewpoint of the high polishing rate and the surface flatness of polished workpieces. Unfortunately, cerium oxide is unevenly distributed over the world and is not stably supplied. Accordingly, there is a demand for developing a method for producing a polishing material that can polish workpieces with high accuracy at a reduced amount of cerium oxide.

As a method of producing polishing material including highly pure cerium oxide with which precision polishing can be performed in a step of producing optical glass, etc., there is a method of adding salts of carbonic acid, oxalic acid, acetic acid, etc. to an aqueous solution of refined cerium nitrate, cerium chloride, cerium sulfate, etc. to precipitate products such as cerium carbonate, cerium oxalate, and cerium acetate, filtering the precipitate, drying, and then baking to obtain cerium oxide.

For example, Non-Patent Literature 1 proposes a method of heating and mixing an aqueous solution of cerium nitrate aqueous solution, yttrium nitrate aqueous solution and urea to obtain particles with a narrow particle size distribution.

Patent Literature 1 describes a polishing material including a composite grinding material including a core layer formed with a base particle including inorganic material with a smaller relative weight than cerium oxide and a shell layer formed by bonding fine particles including cerium oxide with a particle size smaller than the base particle with a binder on the outside of the base particle. The above describes that such polishing material can be obtained by adding while mixing aluminum oxide sol which is to be a binder to a dispersion liquid dispersed with silicon oxide elementary particles which are base particles, further adding while mixing a dispersion liquid dispersed with cerium oxide particles, separating the obtained solid where the base particle (silicon oxide) and the fine particle (cerium oxide) are bonded through a binder (aluminum oxide), baking the separated solid at 700° C. to 900° C., and grinding the obtained baked product with a dry jet mill. According to this method, a core-shell structure is employed for the particle, the core-shell structure including a base particle (core layer) including silicon oxide and a shell layer including cerium oxide formed by bonding with a binder on the outside of the base particle. Consequently, it is possible to obtain polishing accuracy and polishing rate the same as conventional products while reducing the amount of cerium oxide used.

PRIOR ART DOCUMENT

Patent Literature

Patent Literature 1: Japanese Patent Application Laid-Open Publication No. 2012-11525

Non-Patent Literature

Non-Patent Literature 1: J. Am. Ceram. Soc., vol. 71, issue 10, pp. 845-853, (1988)

SUMMARY OF INVENTION

Problems to be Solved by the Invention

However, as a result of baking the particle produced by the method described in Non-Patent Literature 1 and confirming the effects as the particle material, the polishing rate was low. This is thought to be because, an element other than cerium (yttrium) is largely mixed on the surface of the particle in order to adjust the particle shape and particle size distribution.

Moreover, the polishing material including cerium oxide bonded with a binder obtained from the method of Patent Literature 1 applies pressure on the polishing composition to provide friction force to the workpiece when polishing. Therefore, due to the pressure applied to the polishing material particle, the polishing material particle itself is damaged over the course of time, and this leads to reduction in polishing rate.

An object of the present invention, which has been made in view of the above circumstances, is to provide a producing method of a polishing material particle in which the amount of cerium oxide used is suppressed while obtaining high durability and polishing rate.

Means for Solving the Problem

In order to solve the above-described problems, the invention according to Aspect 1 provides a production method for polishing material particles, the method including:

forming a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and forming an inner layer of a precursor of the polishing material particle mainly composing the salt of the element;

adding for a predetermined amount of time an aqueous solution prepared with the salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and a salt of Ce in a reaction solution in which the salt of the element formed in the inner layer forming is dispersed, and forming an outer layer of the precursor of the polishing material particle on an outer side of the inner layer, the outer layer including a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and a salt of Ce;

separating the precursor of the polishing material particle with the outer layer formed in the outer layer forming from the reaction solution; and baking the precursor of the polishing material particle obtained in the separating in the air or in an oxidizing atmosphere, wherein, the reaction solution which forms a surface of the precursor of the polishing material particle in the outer layer forming includes at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and Ce, and a percentage of the Ce is 60 mol % or more and 90 mol % or less with respect to a total included amount of the element included in the reaction solution.

The invention according to Aspect 2 provides the production method for polishing material particles of Aspect 1, wherein, the reaction solution in the inner layer forming and the outer layer forming includes at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals, and a total value of ion concentration of the element and ion concentration of Ce is 100.20 mmol/L or less.

The invention according to Aspect 3 provides the production method for polishing material particles of Aspect 1 or 2, wherein, the salt formed in the inner layer forming and the outer layer forming is a basic carbonate.

The invention according to Aspect 4 provides the production method for polishing material particles of Aspect 3, wherein, in the inner layer forming, an aqueous solution prepared with a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and urea compound is mixed, a basic carbonate of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals is formed, and the inner layer of the precursor of the polishing material particle mainly composed of the basic carbonate of the element is formed.

Advantageous Effects of Invention

According to the present invention, the amount of cerium oxide used can be suppressed while obtaining high durability and polishing rate.

EMBODIMENT FOR CARRYING OUT THE INVENTION

Known polishing materials, and the producing method of the polishing material of the present invention are described in detail below.

<Polishing Material>

A typical polishing material is slurry of polishing material particles, for example, iron oxide ($\alpha Fe_2O_e$), cerium oxide, aluminum oxide, manganese oxide, zirconium oxide, or colloidal silica dispersed in water or oil. The present invention relates to a novel method of producing polishing material particles used in polishing material mainly composed of cerium oxide that can be applied to chemical mechanical polishing (CMP) that polishes a workpiece by physical and chemical actions for achieving a sufficient polishing rate, while maintaining a flatness with high accuracy in the process of polishing a semiconductor device or glass. The details will now be described.

<Structure of Polishing Material Particle>

Figure 1:
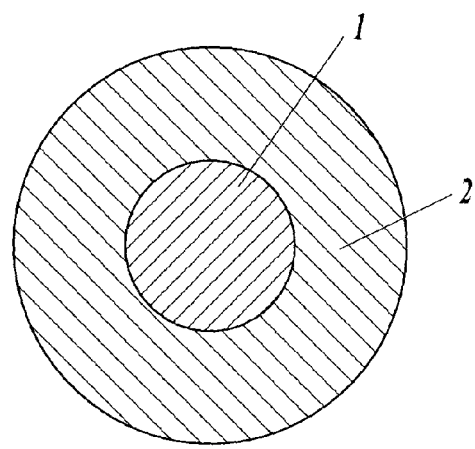
FIG. 1 is a schematic diagram showing a structure of a polishing material particle of an embodiment of the present invention.

Preferably, the polishing material particle of the present invention has a two-layer structure including an inner layer 1 and an outer layer 2. Specifically, as shown in FIG. 1, the polishing material particle with the two-layer structure includes an inner layer 1 mainly consisting of a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals, such as yttrium oxide, and an outer layer 2 formed on the outside of the inner layer 1.

In the inner layer 1, a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals, such as yttrium oxide, accounts for almost 100 mol %, and cerium oxide is hardly included. This is because the salt of the element is not as easily damaged as cerium oxide by the stress in polishing. In the description below, Y (yttrium) is to be the at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals.

The outer layer 2 includes, for example, yttrium oxide and cerium oxide, and the composition of the cerium oxide increases successively from the center of the polishing material particle toward the surface. Specifically, within the outer layer 2, the composition of the portion closer to the inner layer 1 on the center side of the polishing material particle accounts for a larger percentage of yttrium oxide. The percentage of the cerium oxide composing the composition of the outer layer 2 successively increases from the center side of the polishing material particle toward the surface side. The shape of the polishing material particle is not limited to a sphere shape and can be a substantial oval shape or the like.

<Method of Producing Polishing Particle>

A method of producing the polishing material particle including the inner layer 1 and the outer layer 2 is described below.

Figure 2:
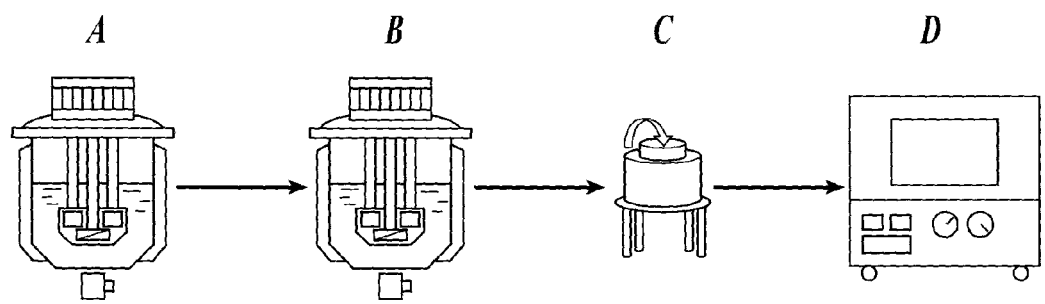
FIG. 2 is a schematic diagram showing a flow of producing the polishing material particle of the embodiment of the present invention.

As shown in FIG. 2, the method of producing the polishing material particle according to the present invention includes the following four steps, inner layer forming step A, outer layer forming step B, solid-liquid separating step C, and baking step D.

1. Inner Layer Forming Step A

In the inner layer forming step A, a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals is formed and the inner layer 1 of a precursor of the polishing material particle mainly consisting of the salt of the element is formed. Specifically, in the inner layer forming step A, salt of yttrium and precipitant are dissolved in water to prepare a solution with a predetermined concentration. Then, in the inner layer forming step A, the prepared solution is heated at 80° C. or more and mixed, and forms a basic carbonate which does not dissolve in water and which becomes the inner layer 1 of the precursor of the polishing material particle. In the description below, the solution in which the heating and mixing is started is to be the reaction solution.

In the inner layer forming step A, the salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals which is dissolved in water may be, for example, nitrate, hydrochloride, or sulfate, and preferred is nitrate since few impurities are mixed in the product. Moreover, as the precipitant, any type of alkaline compound which generates basic carbonate when mixed and heated in water with the salt of the element can be used. Preferable examples include urea compound, ammonium carbonate, ammonium bicarbonate and the like. Examples of the urea compound include salts of urea (e.g., nitrate and hydrochloride), N,N'-dimethylacetylurea, N,N'-dibenzoylurea, benzenesulfonylurea, p-toluenesulfonylurea, trimethylurea, tetraethylurea, tetramethylurea, triphenylurea, tetraphenylurea, N-benzoylurea, methylisourea, and ethylisourea, and urea is also included. Specifically, urea is preferable among the urea compounds, because precipitate is slowly generated by gradually hydrolyzing and even precipitate can be obtained. Moreover, basic carbonate which does not dissolve in water, such as basic carbonate of yttrium is generated so that deposited precipitant can be dispersed in a state of monodispersion. Basic carbonate of cerium is formed in the outer layer forming step B described below, and therefore, a successive layer structure can be formed with the basic carbonate. In the following embodiment, the aqueous solution added in the reaction solution in the inner layer forming step A and the outer layer forming step B is an yttrium nitrate aqueous solution prepared by dissolving in water yttrium nitrate as the salt of the at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals. Moreover, urea is used as the urea compound but is merely an example, and the present invention should not be limited to the example.

Preferably, in the inner layer forming step A, the adding speed of the aqueous solution including yttrium is 0.003 mol/L to 5.5 mol/L for each minute, and the aqueous solution is added in the reaction solution while heating at 80° C. or more and mixing. By setting the adding speed within the above range, spherical polishing material particles showing high monodispersion properties are easily formed. When the heating temperature in heating and mixing is set to 80° C. or more, the decomposition of the added urea easily progresses. Preferably, the concentration of the added urea is a concentration 5 to 50 times the ion concentration of the yttrium. By setting the urea concentration and the ion concentration in the yttrium aqueous solution within the above range, spherical polishing material particles showing monodispersion properties can be synthesized.

The mixer in the heating and mixing may have any shape and other factors that can provide a sufficient mixing efficiency. In order to achieve a higher mixing efficiency, a mixer of a rotor stator type is preferably used.

2. Outer Layer Forming Step B

In the outer layer forming step B, an aqueous solution prepared with yttrium nitrate and cerium nitrate is added for a predetermined amount of time at a certain rate in a reaction solution in which, for example, basic carbonate of yttrium formed in the inner layer forming step A is dispersed and the outer layer 2 of the precursor of the polishing material particle including yttrium basic carbonate and cerium basic carbonate is formed on the outer side of the inner layer 1. Cerium nitrate is used here since it is preferable to use nitrate as the salt of the cerium used in preparing the aqueous solution because impurities are hardly mixed in the product. However, the example is not limited to the above, and hydrochloride, sulfate and the like can be used.

Preferably, the adding speed of the aqueous solution added in the outer layer forming step B is 0.003 mol/L to 5.5 mol/L each minute. Here, the adding speed is set to the above range so that spherical polishing material particle with high monodispersion properties is easily formed. Moreover, preferably, the percentage of the concentration of cerium included in the added aqueous solution is 90 mol % or less. This is because when the percentage of the concentration of cerium in the added aqueous solution is larger than 90 mol %, if the aqueous solution is added with the same adding time as when the aqueous solution is prepared at 90 mol % or less, the formed polishing material particle does not show monodispersion properties and aggregates in a plate shape. Further, preferably, the reaction solution is heated at 80° C. or more and mixed while the aqueous solution is added at the above adding speed. This is because when the reaction solution is heated at 80° C. or more and mixed, the decomposition of the urea added in the inner layer forming step A easily progresses.

Figure 3:
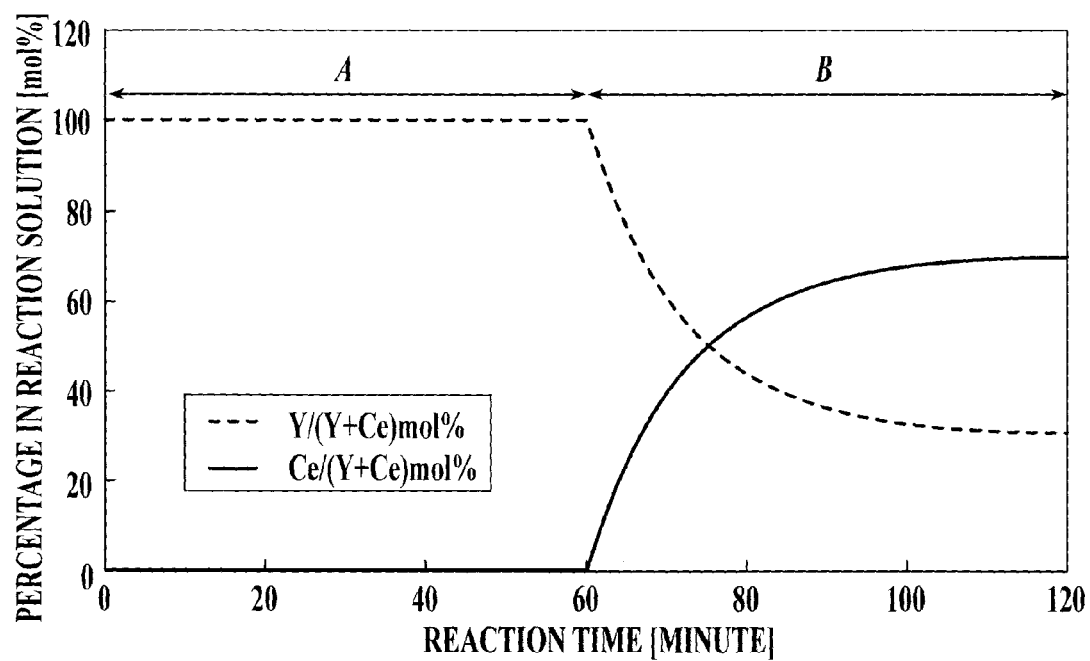
FIG. 3 is a graph schematically showing a composition ratio of elements included in a reaction solution which forms the polishing material particle of the embodiment of the present invention.

The change of the composition ratio of yttrium and cerium included in the reaction solution in the inner layer forming step A and the outer layer forming step B is shown in FIG. 3. In FIG. 3, from the start of reaction to 60 minutes later, the composition ratio of the reaction solution in the inner layer forming step A is shown. From 60 minutes after the reaction starts until the reaction ends 120 minutes later, the composition ratio of the reaction solution in the outer layer forming step B is shown. Specifically, in the inner layer forming step A, the start of heating and mixing the aqueous solution prepared with yttrium nitrate and urea is to be the start of reaction, and the inner layer 1 of the precursor of the polishing material particle is formed in the reaction solution with yttrium accounting for 100 mol % until 60 minutes pass. In the inner layer forming step A, since the yttrium included in the reaction solution is consumed by forming the inner layer 1, preferably, an aqueous solution including yttrium is added at a predetermined interval.

In the outer layer forming step B, the aqueous solution prepared at a predetermined density including yttrium and cerium is added to the reaction solution for a predetermined amount of time, and with this, the composition of the cerium in the reaction solution successively increases. Specifically, as shown in FIG. 3, in the composition of the reaction solution in the outer layer forming step B, the composition ratio of cerium in the reaction solution increases after starting the adding of the aqueous solution and the composition ratio of yttrium decreases. Around 100 minutes after starting the heating and mixing, a large change in the composition in the reaction solution cannot be seen and the composition ratio between the yttrium and cerium in the added aqueous solution becomes closer. The outer layer 2 formed in the outer layer forming step B is formed in the composition ratio between yttrium and cerium corresponding to the change in the composition of the reaction solution.

Specifically, the composition of the reaction solution which forms the surface of the precursor of the polishing material particle in the outer layer forming step B is prepared so that the percentage of cerium among the yttrium and cerium is 60 mol % or more and 90 mol % or less. Here, the surface of the precursor of the polishing material particle is the face on the side not in contact with the inner layer 1 on the outer layer 2 formed on the precursor of the polishing material particle. Since the percentage of the cerium in the reaction solution is prepared within the above range, the cerium does not grow abnormally on the surface of the outer layer 2 formed, and the particle can be grown showing monodispersion properties. In order to stimulate particle growth showing monodispersion properties without the cerium aggregating alone, preferably, the percentage of the cerium is 60 mol % or more and 81 mol % or less.

Preferably, the reaction solution of the inner layer forming step A and the outer layer forming step B includes yttrium, and the reaction solution is prepared so that the total value of the ion concentration of the yttrium and cerium included is 100.20 mmol/L or less. By including yttrium in the reaction solution, basic carbonate of yttrium which is to be the inner layer 1 is formed by decomposition reaction of urea. The reaction solution is prepared so that the total value of the ion concentration of the included yttrium and cerium is 100.20 mmol/L or less. With this, aggregation is suppressed and the basic carbonate which is to be the precursor of the polishing material particle can be formed. More preferably, the reaction solution is prepared so that the total value of the ion concentration of the included yttrium and cerium is 50.33 mmol/L or less. With this, growth of particles with more uniform average particle size can be stimulated. The adding of the aqueous solution prepared with yttrium nitrate and cerium nitrate in the outer layer forming step B is adjusted so that the amount of yttrium and cerium deposited from the reaction solution is supplemented. Therefore, the total ion concentration of the reaction solution is adjusted to be maintained substantially the same. The time that the aqueous solution is added from the start of heating and mixing of the reaction solution and the reaction end time can be suitably changed according to the target average particle size of the polishing material particle and the composition ratio of the cerium included in the outer layer 2.

3. Solid-Liquid Separating Step C

In the solid-liquid separating step, the precursor of the polishing material particle with the outer layer 2 formed in the outer layer forming step B is separated from the reaction solution. In the solid-liquid separation step C, the resulting polishing material particle precursor is optionally dried and may be then subjected to the baking step D.

4. Baking Step D

In the baking step D, the polishing material particle precursor obtained by the solid-liquid separating step C is baked in the air or in an oxidizing atmosphere at 300° C. or higher. The carbon dioxide separates from the precursor of the polishing material particle by being baked. The precursor of the polishing material particle is converted from a basic carbonate to an oxide and the target polishing material particle is obtained.

<Polishing Material Particle Size and Polishing Rate, Surface Precision>

The demanded level of the particle size of the polishing material particle is different depending on the purpose of use. As the surface precision of the finish after polishing becomes higher, the polishing material particles included in the used polishing material need to be made finer. For example, the average particle size needs to be 2.0 μm or less to be used in a step of producing a semiconductor device. As the particle size of the polishing material becomes smaller, the surface precision of the finish after polishing becomes higher. However, as the particle size becomes smaller, the polish rate tends to become slower. Therefore, when the particle size is less than 0.02 μm, the advantage of the polishing rate of the cerium polishing material being faster compared to the polishing material of colloidal silica, etc. is lost. Therefore, preferably, the average particle size of the polishing material particle is within the range of 0.02 to 2.0 μm, and even more preferably within the range of 0.05 to 1.5 μm In order to enhance the surface precision after the polishing process, it is preferable to use polishing material where the particle size is even as much as possible and the variation coefficient of the particle size distribution is small.

<Use and Deterioration of Polishing Material>

A method of using the polishing material will now be described by a polishing process of a glass substrate for an information recording disk as an example.

1. Preparation of Polishing Material Slurry

A slurry of a polishing material is produced by adding a powder of the polishing material including the polishing material particle to a solvent such as water. Aggregation is prevented by adding, for example, a dispersant to the polishing material slurry, and the dispersion state is maintained by constantly mixing the slurry with a mixer or the like. The slurry of the polishing material is circularly supplied to a polisher with a supply pump.

2. Polishing Step

A glass substrate is brought into contact with the upper and lower surface plates of a polisher provided with polishing pads (polishing cloth). Polishing is performed by relatively moving the pads and the glass under a pressurized condition, while the slurry of the polishing material being supplied to the contact surfaces.

3. Deterioration of Polishing Material

The polishing material is used under a pressurized condition as described in the polishing step. Accordingly, the polishing material particle contained in the polishing material is gradually disintegrated with elapse of the polishing time and are reduced in size. The reduction in size of the polishing material particle causes a reduction in polishing rate. Accordingly, polishing material particles showing a

EXAMPLES

The present invention will now be specifically described by way of examples and comparative examples, but should not be construed to limit the scope of the invention in any way.

Polishing Material 1: Example 1

1. 10 L of water was prepared so that yttrium nitrate aqueous solution was 0.001 mol/L and urea was 0.025 mol/L. The above was sufficiently mixed and then heating at 90° C. with mixing was started.
2. 0.1 mol/L of yttrium nitrate aqueous solution was added to the aqueous solution of 1 at an adding rate of 1 mL each minute for 60 minutes.
3. Nitrate aqueous solution including 0.03 mol/L of yttrium and 0.07 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 2: Example 2

1. 10 L of water was prepared so that yttrium nitrate aqueous solution was 0.01 mol/L and urea was 0.25 mol/L. The above was sufficiently mixed and then heating at 90° C. with mixing was started.
2. 1.0 mol/L of yttrium nitrate aqueous solution was added to the aqueous solution of 1 at an adding rate of 1 mL each minute for 60 minutes.
3. Nitrate aqueous solution including 0.1 mol/L of yttrium and 0.9 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 3: Example 3

1. 10 L of water was prepared so that yttrium nitrate aqueous solution was 0.01 mol/L and urea was 0.25 mol/L. The above was sufficiently mixed and then heating at 90° C. with mixing was started.
2. 1.0 mol/L of yttrium nitrate aqueous solution was added to the aqueous solution of 1 at an adding rate of 1 mL each minute for 60 minutes.
3. Nitrate aqueous solution including 0.2 mol/L of yttrium and 0.8 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 4: Example 4

1. 10 L of water was prepared so that yttrium nitrate aqueous solution was 0.01 mol/L and urea was 0.25 mol/L. The above was sufficiently mixed and then heating at 90° C. with mixing was started.
2. Nitrate aqueous solution including 0.2 mol/L of yttrium and 0.8 mol/L of cerium was added to the aqueous solution of 1 at an adding rate of 1 mL each minute for 120 minutes.
3. The precursor of the polishing material particle deposited in the above 1 to 2 is separated with the membrane filter and baked at 600° C. to obtain the polishing material particle.

Polishing Material 5: Example 5

1. 10 L of water was prepared so that yttrium nitrate aqueous solution was 0.01 mol/L and urea was 0.25 mol/L. The above was sufficiently mixed and then heating at 90° C. with mixing was started.
2. 1.0 mol/L of yttrium nitrate aqueous solution was added to the aqueous solution of 1 at an adding rate of 1 mL each minute for 60 minutes.
3. Nitrate aqueous solution including 0.3 mol/L of yttrium and 0.7 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 6: Example 6

1. 10 L of water was prepared so that yttrium nitrate aqueous solution was 0.01 mol/L and urea was 0.25 mol/L. The above was sufficiently mixed and then heating at 90° C. with mixing was started.
2. 1.0 mol/L of yttrium nitrate aqueous solution was added to the aqueous solution of 1 at an adding rate of 1 mL each minute for 60 minutes.
3. Nitrate aqueous solution including 0.4 mol/L of yttrium and 0.6 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 7: Example 7

1. 10 L of water was prepared so that yttrium nitrate aqueous solution was 0.05 mol/L and urea was 1.25 mol/L. The above was sufficiently mixed and then heating at 90° C. with mixing was started.
2. 5.0 mol/L of yttrium nitrate aqueous solution was added to the aqueous solution of 1 at an adding rate of 1 mL each minute for 60 minutes.
3. Nitrate aqueous solution including 1.5 mol/L of yttrium and 3.5 mol/L of cerium was added to the aqueous solution of 2 at an adding rate of 1 mL each minute for 60 minutes.
4. The precursor of the polishing material particle deposited in the above 1 to 3 is separated with the membrane filter and baked at 600° C. to obtain the polishing material particle.

Polishing Material 8: Example 8

1. 10 L of water was prepared so that yttrium nitrate aqueous solution was 0.1 mol/L and urea was 2.5 mol/L. The above was sufficiently mixed and then heating at 90° C. with mixing was started.

smaller change in particle size distribution between before and after the polishing are desired.

2. 5.0 mol/L of yttrium nitrate aqueous solution was added to the aqueous solution of 1 at an adding rate of 2 mL each minute for 60 minutes.

3. Nitrate aqueous solution including 1.5 mol/L of yttrium and 3.5 mol/L of cerium was added to the aqueous solution of 2 at an adding rate of 2 mL each minute for 60 minutes.

4. The precursor of the polishing material particle deposited in the above 1 to 3 is separated with the membrane filter and baked at 600° C. to obtain the polishing material particle.

Polishing Material 9: Example 9

1. 10 L of water was prepared so that yttrium nitrate aqueous solution was 0.11 mol/L and urea was 2.75 mol/L. The above was sufficiently mixed and then heating at 90° C. with mixing was started.

2. 5.5 mol/L of yttrium nitrate aqueous solution was added to the aqueous solution of 1 at an adding rate of 2 mL each minute for 60 minutes.

3. Nitrate aqueous solution including 1.65 mol/L of yttrium and 3.85 mol/L of cerium was added to the aqueous solution of 2 at an adding rate of 2 mL each minute for 60 minutes.

4. The precursor of the polishing material particle deposited in the above 1 to 3 is separated with the membrane filter and baked at 600° C. to obtain the polishing material particle.

Polishing Material 10: Comparative Example 1

1. 10 L of water was prepared so that urea was 0.25 mol/L. The above was sufficiently mixed and then heating at 90° C. with mixing was started.

2. 1.0 mol/L of yttrium nitrate aqueous solution was added to the aqueous solution of 1 at an adding rate of 1 mL each minute for 60 minutes.

3. Nitrate aqueous solution including 1.0 mol/L of cerium was added to the aqueous solution of 2 at an adding rate of 1 mL each minute for 10 minutes.

4. The precursor of the polishing material particle deposited in the above 1 to 3 is separated with the membrane filter and baked at 600° C. to obtain the polishing material particle.

Polishing Material 11: Comparative Example 2

1. 10 L of water was prepared so that urea was 0.25 mol/L. The above was sufficiently mixed and then heating at 90° C. with mixing was started.

2. 1.0 mol/L of yttrium nitrate aqueous solution was added to the aqueous solution of 1 at an adding rate of 1 mL each minute for 60 minutes.

3. Nitrate aqueous solution including 1.0 mol/L of cerium was added to the aqueous solution of 2 at an adding rate of 1 mL each minute for 60 minutes.

4. The precursor of the polishing material particle deposited in the above 1 to 3 is separated with the membrane filter and baked at 600° C. to obtain the polishing material particle.

Polishing Material 12: Comparative Example 3

1. 10 L of water was prepared so that yttrium nitrate aqueous solution was 0.01 mol/L and urea was 0.25 mol/L. The above was sufficiently mixed and then heating at 90° C. with mixing was started.

2. 1.0 mol/L of yttrium nitrate aqueous solution was added to the aqueous solution of 1 at an adding rate of 1 mL each minute for 60 minutes.

3. Nitrate aqueous solution including 0.05 mol/L of yttrium and 0.95 mol/L of cerium was added to the aqueous solution of 2 at an adding rate of 1 mL each minute for 60 minutes.

4. The precursor of the polishing material particle deposited in the above 1 to 3 is separated with the membrane filter and baked at 600° C. to obtain the polishing material particle.

Polishing Material 13: Comparative Example 4

1. 10 L of water was prepared so that yttrium nitrate aqueous solution was 0.01 mol/L and urea was 0.25 mol/L. The above was sufficiently mixed and then heating at 90° C. with mixing was started.

2. 1.0 mol/L of yttrium nitrate aqueous solution was added to the aqueous solution of 1 at an adding rate of 1 mL each minute for 60 minutes.

3. Nitrate aqueous solution including 0.5 mol/L of yttrium and 0.5 mol/L of cerium was added to the aqueous solution of 2 at an adding rate of 1 mL each minute for 60 minutes.

4. The precursor of the polishing material particle deposited in the above 1 to 3 is separated with the membrane filter and baked at 600° C. to obtain the polishing material particle.

The conditions of the experiment regarding the above-described polishing material 1 to 13 are described in table 1. In table 1, Y concentration and U concentration show the concentration of yttrium and the concentration of urea in the aqueous solution prepared before starting the reaction. Added Y concentration and added Ce concentration show the concentration of the yttrium and the cerium included in the added aqueous solution. Adding time 1, adding time 2, and adding rate respectively show the time the aqueous solution was added in the inner layer forming step A, the time the aqueous solution was added in the outer layer forming step B, and the adding rate of the aqueous solution.

TABLE 1

| POLISHING MATERIAL | EXAMPLE/ COMPARATIVE EXAMPLE | INNER LAYER FORMING | | | | | OUTER LAYER FORMING | | | |
|---|---|---|---|---|---|---|---|---|---|---|
| | | Y CONCENTRATION [mol/L] | U CONCENTRATION [mol/L] | ADDED Y CONCENTRATION [mol/L] | ADDING RATE [mL/min] | ADDING TIME 1 [min] | ADDED Y CONCENTRATION [mol/L] | ADDED Ce CONCENTRATION [mol/L] | ADDING RATE [mL/min] | ADDING TIME 2 [min] |
| 1 | EXAMPLE 1 | 0.001 | 0.025 | 0.1 | 1 | 60 | 0.030 | 0.070 | 1 | 60 |
| 2 | EXAMPLE 2 | 0.010 | 0.250 | 1.0 | 1 | 60 | 0.100 | 0.900 | 1 | 60 |
| 3 | EXAMPLE 3 | 0.010 | 0.250 | 1.0 | 1 | 60 | 0.200 | 0.800 | 1 | 60 |
| 4 | EXAMPLE 4 | 0.010 | 0.250 | 0 | — | — | 0.200 | 0.800 | 1 | 120 |
| 5 | EXAMPLE 5 | 0.010 | 0.250 | 1.0 | 1 | 60 | 0.300 | 0.700 | 1 | 60 |

TABLE 1-continued

| POLISHING MATERIAL | EXAMPLE/ COMPARATIVE EXAMPLE | INNER LAYER FORMING | | | | | OUTER LAYER FORMING | | | |
|---|---|---|---|---|---|---|---|---|---|---|
| | | Y CONCEN- TRATION [mol/L] | U CONCEN- TRATION [mol/L] | ADDED Y CONCEN- TRATION [mol/L] | ADDING RATE [mL/ min] | ADDING TIME 1 [min] | ADDED Y CONCEN- TRATION [mol/L] | ADDED Ce CONCEN- TRATION [mol/L] | ADDING RATE [mL/ min] | ADDING TIME 2 [min] |
| 6 | EXAMPLE 6 | 0.010 | 0.250 | 1.0 | 1 | 60 | 0.400 | 0.600 | 1 | 60 |
| 7 | EXAMPLE 7 | 0.050 | 1.250 | 5.0 | 1 | 60 | 1.500 | 3.500 | 1 | 60 |
| 8 | EXAMPLE 8 | 0.100 | 2.500 | 5.0 | 2 | 60 | 1.500 | 3.500 | 2 | 60 |
| 9 | EXAMPLE 9 | 0.110 | 2.750 | 5.5 | 2 | 60 | 1.650 | 3.850 | 2 | 60 |
| 10 | COMPARATIVE EXAMPLE 1 | 0 | 0.250 | 1.0 | 1 | 60 | 0.000 | 1.000 | 1 | 10 |
| 11 | COMPARATIVE EXAMPLE 2 | 0 | 0.250 | 1.0 | 1 | 60 | 0.000 | 1.000 | 1 | 60 |
| 12 | COMPARATIVE EXAMPLE 3 | 0.010 | 0.250 | 1.0 | 1 | 60 | 0.050 | 0.950 | 1 | 60 |
| 13 | COMPARATIVE EXAMPLE 4 | 0.010 | 0.250 | 1.0 | 1 | 60 | 0.500 | 0.500 | 1 | 60 |

<Evaluation of Polishing Material>

Regarding the solution after the outer layer forming step B (after the end of reaction) of the polishing material 1 to 13, the composition is analyzed and the shape and the polishing performance of the polishing material 1 to 13 are evaluated according to the method below.

1. Composition Analysis of Reaction Solution

The solution including the precipitate after the end of the reaction was taken and the precipitate was separated from the supernatant. Then, the concentration of yttrium, the concentration of cerium and the total value included in the supernatant were measured using the hydrofluoric acid introducing system with ICP-AES (SPS3520V) of SII NanoTechnology Inc. The obtained total value of the concentration of yttrium and cerium is to be the reaction solution concentration. The composition ratio of cerium in the reaction solution was calculated based on the concentration of yttrium and the concentration of cerium which were obtained.

2. Element Analysis

Figure 4A:
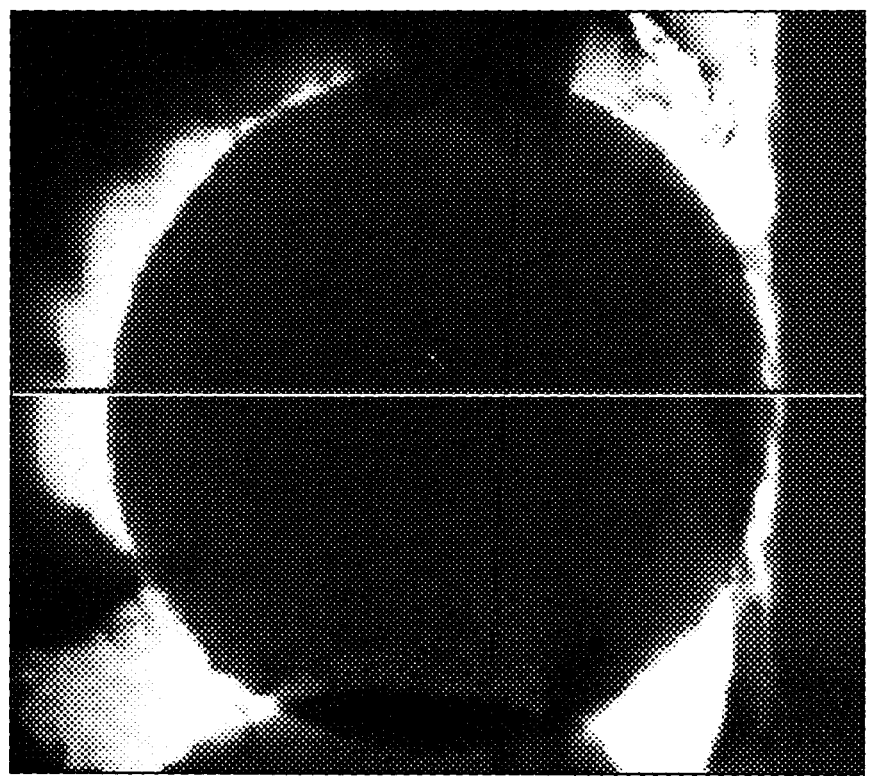
FIG. 4A is an example of a picture near a center of a particle cutting the polishing material particle of the present invention.
Figure 4B:
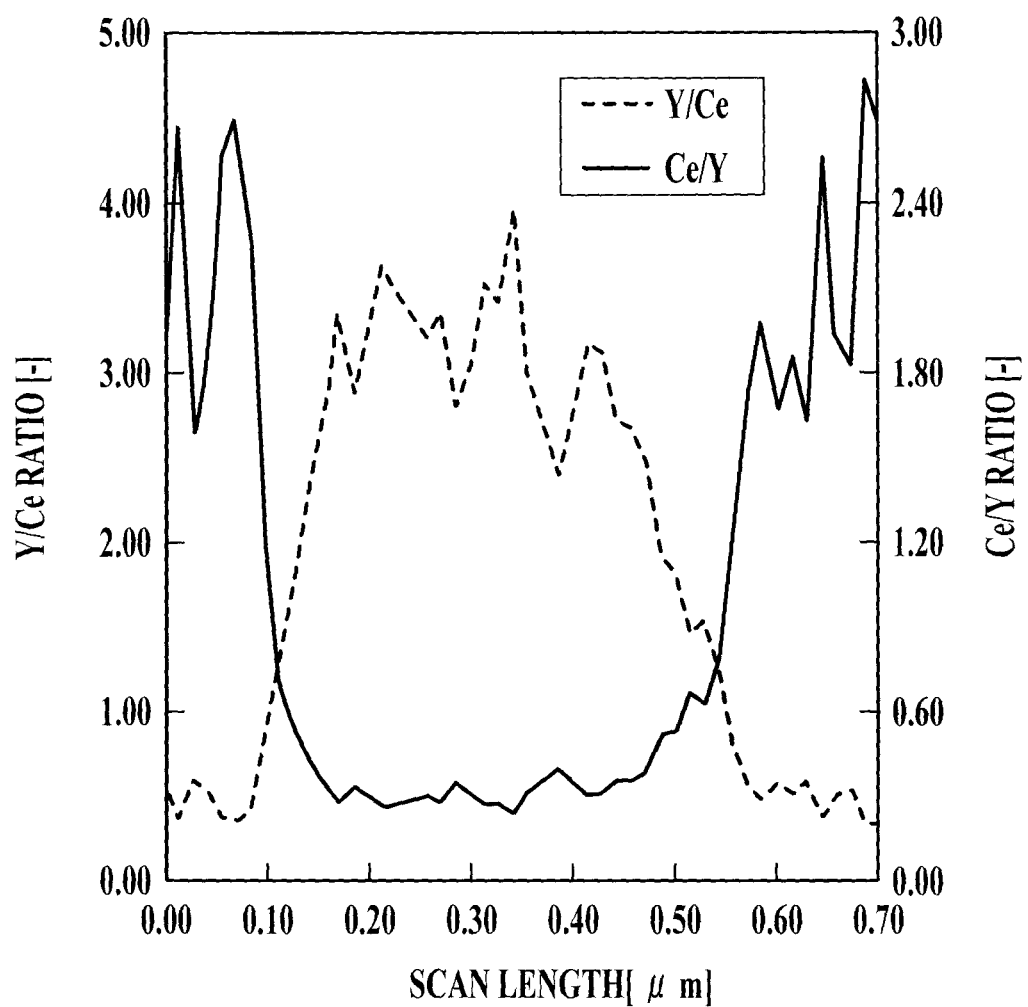
FIG. 4B is an example of an element analysis result near the center of the particle cutting the polishing material particle of the present invention.

Focusing ion beam (FB-2000A) of Hitachi High-Technologies Corporation is used to cut the obtained polishing material particle, and a face which passes near the center of the particle was cut out. STEM-EDX (HD-2000) of Hitachi High-Technologies Corporation was used to perform element analysis of the cut face and the distribution of the particle composition was evaluated. As one example, FIG. 4 shows the element analysis result of the polishing material particle of example 5. It is possible to confirm that in the cut face of the polishing material particle of example 5 shown in FIG. 4A, the percentage of cerium becomes higher near 0.05 μm and near 0.6 μm which is near the surface of the polishing material particle (see FIG. 4B).

3. Average Particle Size and Variation Coefficient of Particle Size Distribution The average particle size and the variation coefficient of the particle size distribution is obtained from the scanning electron microscopic picture (SEM image) of 100 polishing material particles.

Figure 5A:
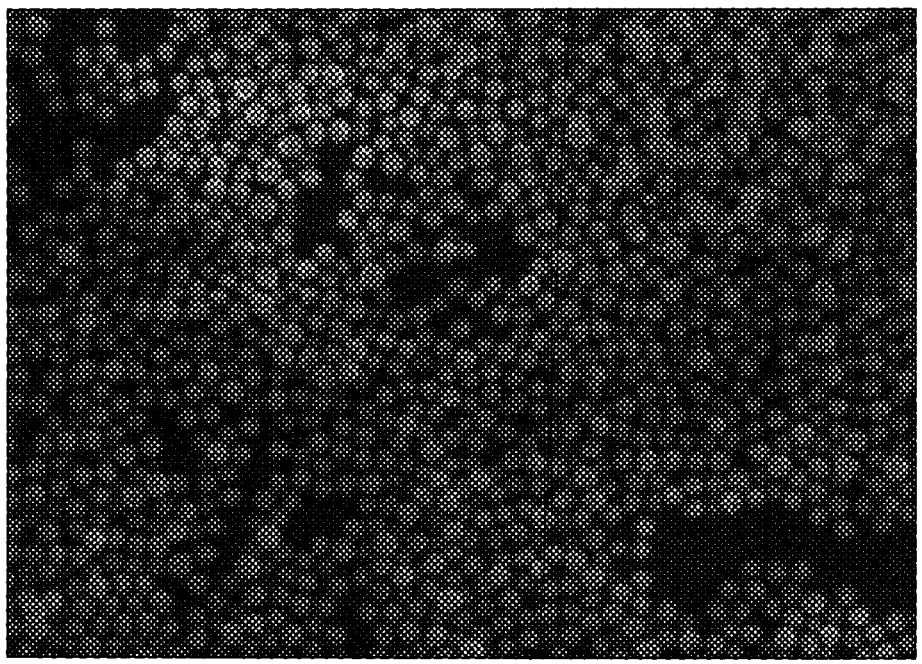
FIG. 5A is an example of a scanning electron microscopic picture of the polishing material particle of the present invention.
Figure 5B:
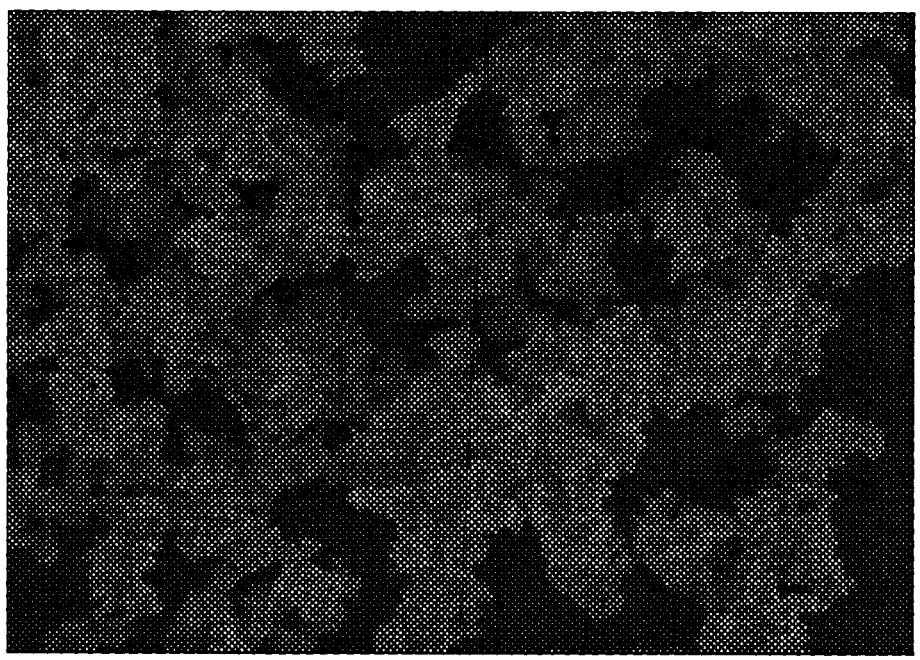
FIG. 5B is an example of a scanning electron microscopic picture of the polishing material particle of the present invention.
Figure 5C:
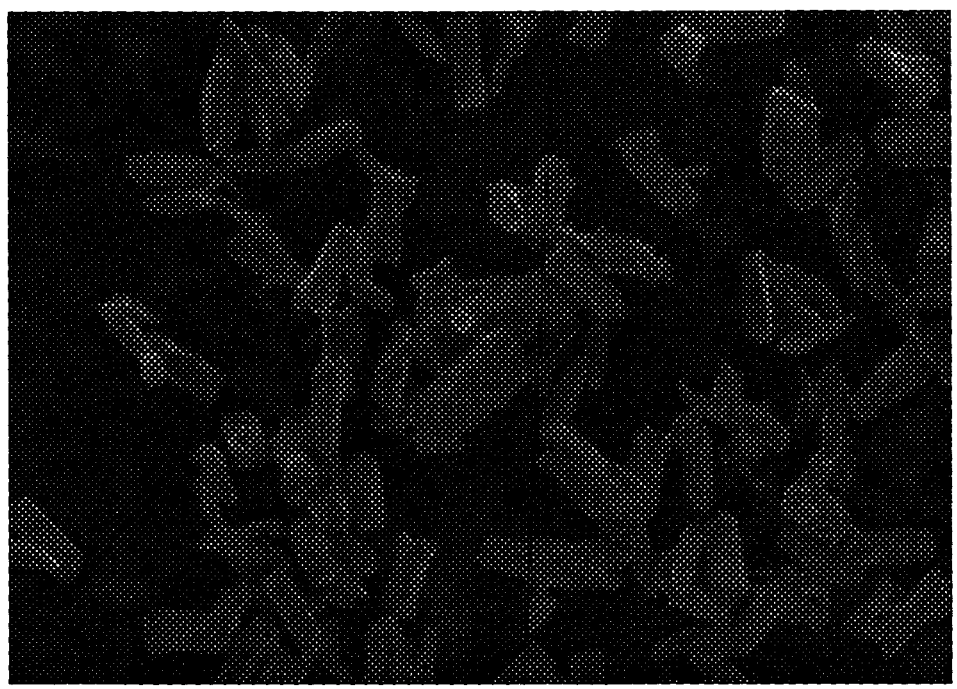
FIG. 5C is an example of a scanning electron microscopic picture of the polishing material particle of the present invention.

FIG. 5 shows the scanning electron microscopic picture of 100 polishing material particles. FIG. 5A shows the polishing material particle in a state of monodispersion in the dispersion solvent. FIG. 5B shows the polishing material particle in an aggregation state in the dispersion solvent. FIG. 5C shows the polishing material particle dispersed in a plate shape in the dispersion solvent.

The variation coefficient of the particle size distribution is obtained by the following formula.

Variation coefficient of particle size distribution (%)=(standard deviation of particle size distribution/average particle size)×100

4. Polishing Rate

The polisher used in the polishing process supplies polishing material slurry in which powder of the polishing material using the polishing material particle is dispersed in the solvent such as water to the face of the polishing workpiece, and polished the face of the polishing workpiece with the polishing cloth. The dispersion solvent of the polishing material slurry was only water, and the concentration was 100 g/L. In the polishing test, the polishing slurry was supplied circulated in a flow rate of 5 L/min and the polishing process was performed. A glass substrate with 65 mmΦ is used as the polishing workpiece and polyurethane cloth was used as the polishing cloth. The pressure on the polishing face in polishing was 9.8 kPa (100 g/cm$^2$), the rotating rate of the polishing tester was set to 100 min$^1$ (rpm), and polishing was performed for 30 minutes. The thickness before and after polishing was measured with Nikon Digimicro (MF501). The polishing amount (μm) for each minute was calculated from the difference in thickness and this was to be the polishing rate. The polishing was repeated successively 5 times at this polishing rate, and the change between the polishing rate at the first time and the fifth time was researched. Here, the polishing rate obtained is shown in table 2 with the polishing rate of the first time as polishing rate 1 and the polishing rate of the fifth time as polishing rate 2.

<Evaluation of Shape and Polishing Performance of Polishing Material>

The result obtained by the above evaluation is shown in table 2.

TABLE 2

| POLISHING MATERIAL | EXAMPLE/ COMPARATIVE EXAMPLE | Ce COMPOSITION RATIO [mol %] | REACTION SOLUTION CONCENTRATION [mmol/L] | SHAPE | AVERAGE PARTICLE SIZE [μm] | VARIATION COEFFICIENT [%] | POLISHING RATE 1 [μm/min] | POLISHING RATE 2 [μm/min] |
|---|---|---|---|---|---|---|---|---|
| 1 | EXAMPLE 1 | 69 | 1.17 | MONO-DISPERSION | 0.34 | 11 | 0.48 | 0.46 |
| 2 | EXAMPLE 2 | 90 | 10.23 | MONO-DISPERSION | 0.63 | 15 | 0.60 | 0.62 |
| 3 | EXAMPLE 3 | 81 | 9.87 | MONO-DISPERSION | 0.49 | 12 | 0.56 | 0.53 |
| 4 | EXAMPLE 4 | 79 | 10.12 | MONO-DISPERSION | 0.53 | 13 | 0.53 | 0.50 |
| 5 | EXAMPLE 5 | 71 | 9.43 | MONO-DISPERSION | 0.52 | 13 | 0.51 | 0.52 |
| 6 | EXAMPLE 6 | 60 | 9.92 | MONO-DISPERSION | 0.54 | 11 | 0.48 | 0.46 |
| 7 | EXAMPLE 7 | 70 | 50.33 | MONO-DISPERSION | 0.59 | 14 | 0.54 | 0.52 |
| 8 | EXAMPLE 8 | 71 | 100.20 | MONO-DISPERSION | 0.71 | 19 | 0.57 | 0.60 |
| 9 | EXAMPLE 9 | 69 | 108.40 | MONO-DISPERSION | 0.75 | 28 | 0.62 | 0.63 |
| 10 | COMPARATIVE EXAMPLE 1 | 87 | 0.68 | MONO-DISPERSION | 0.37 | 21 | 0.46 | 0.25 |
| 11 | COMPARATIVE EXAMPLE 2 | 97 | 0.77 | PLATE SHAPE | 3.77 | 78 | 1.41 | 1.28 |
| 12 | COMPARATIVE EXAMPLE 3 | 92 | 10.76 | PLATE SHAPE | 4.82 | 60 | 1.51 | 1.43 |
| 13 | COMPARATIVE EXAMPLE 4 | 52 | 10.02 | MONO-DISPERSION | 0.48 | 14 | 0.36 | 0.33 |

The Ce composition ratio and the reaction solvent concentration is a value obtained by the composition analysis on the solution after the reaction ends. The shape shown in table 2 is the shape of the particle which can be confirmed from the SEM image of the 100 polishing material particles. The average particle size (μm) is obtained from the SEM image of 100 polishing material particles. The variation coefficient is the variation coefficient of the particle size distribution obtained from the above formula.

As can be seen from table 2, the particle shape of the polishing material particle obtained from the examples 1 to 9 of the present invention show monodispersion properties, the average particle size is small, and the variation coefficient is small. Regarding the polishing performance, high polishing rate is shown. Comparing the value of the polishing rate 1 and the value of the polishing rate 2 which is the polishing rate of the fifth time, the reduction of the polishing rate is suppressed. Therefore, it is possible to understand that the durability is high. According to the above, by forming the precursor of the polishing material particle in the reaction solution with a composition ratio of the cerium in the reaction solution which forms the surface of the outer layer 2 in the outer layer forming step B being within the range of 60 to 90 mol %, and forming the polishing material particle through the following inner layer forming step A to the baking step D, it is possible to obtain the polishing material particle showing high polishing speed and durability while suppressing the amount of cerium oxide used. It is possible to see that the examples 1 to 8 in which the reaction solution concentration is 100.20 mmol/L or less has a smaller average particle size and variation coefficient than the example 9. It is also possible to see that the average particle size and the variation coefficient is smaller than other examples in the examples 1, and 3 to 7 where the reaction solution concentration is within the range of 1.17 to 50.33 mmol/L and the composition ratio of the cerium in the reaction solution is within the range of 60 to 81 mol %.

In the comparative examples 1 and 2, since the aqueous solution including cerium and not including yttrium is added in the outer layer forming step B, the polishing material particle has a two-layer structure including the inner layer 1 including only yttrium oxide and the outer layer 2 including only cerium oxide. In the comparative example 1, since the adding time of the aqueous solution including cerium in the outer layer forming step B is shorter than the other examples, the outer layer 2 is formed thinner than the other examples. Therefore, comparing the values of the polishing rate 1 and the polishing rate 2 of the comparative example 1, the value drastically decreases compared to the other examples. This is assumed to be because the durability is reduced. In the comparative example 2, since the aqueous solution is added with the same adding time as the examples, the value of the composition ratio of the cerium in the reaction solution becomes higher outside the range of the examples, and the polishing material particles is formed in a plate shape. In the comparative example 3, since the percentage of the concentration of cerium in the aqueous solution added in the outer layer forming step B is a high value outside the range of the example, the composition ratio of cerium in the reaction solution becomes a high value outside the range of the example, and the polishing material particle is formed in a plate shape. In the comparative example 4, the percentage of the concentration of the cerium in the aqueous solution added in the outer layer forming step B is a low value outside the range of the example. Therefore, the composition ratio of the cerium in the reaction solution forming the surface of the outer layer 2 in the outer layer forming step B becomes a low value outside the range of the example, and the polishing rate of the polishing material particle shows a lower value than the example.

As described above, according to the method of producing a polishing material particle of the present embodiment, the method includes the following. In the inner layer forming step A, a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals is formed, and an inner layer 1 of the precursor of the polishing material particle mainly consisting of the salt of the element is formed. In the outer layer forming step B, the aqueous solution prepared with a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and a salt of Ce is added for a predetermined amount of time in the reaction solution in which the salt of the element formed in the inner layer forming step A is dispersed. With this, the outer layer 2 of the precursor of the polishing material particle is formed on the outer side of the inner layer 1, including a salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and a salt of Ce. In the solid-liquid separating step C, the precursor of the polishing material particle in which the outer layer 2 is formed in the outer layer forming step B is separated from the reaction solution. In the baking step D, the precursor of the polishing material particle obtained in the solid-liquid separating step C is baked in the air or in the oxidizing atmosphere. The reaction solution which forms the surface of the precursor of the polishing material particle in the outer layer forming step B includes at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and Ce. The percentage of Ce is 60 mol % or more and 90 mol % or less with respect to the total included amount of the element included in the reaction solution. Consequently, the composition ratio of cerium oxide can be successively increased from the center of the polishing material particle to the surface. With this, it is possible to use a large amount of cerium oxide on the surface of the polishing material particle while suppressing the amount of cerium oxide used, and it is possible to produce the polishing material particle showing the high polishing rate and durability due to the cerium oxide.

The reaction solution in the inner layer forming step A and the outer layer forming step B includes at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and a total value of the ion concentration of the element and the ion concentration of Ce is 100.20 mmol/L or less. Consequently, it is possible to suppress aggregation and to form salt which is to be the precursor of the polishing material particle.

The salt formed in the inner layer forming step A and the outer layer forming step B is a basic carbonate. Consequently, the formed salt does not dissolve in the aqueous solution which is the reaction solution, and is able to disperse showing monodispersion properties in the reaction solution.

In the inner layer forming step A, the aqueous solution prepared with the salt of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals and the urea compound is mixed, a basic carbonate of at least one element selected from the group consisting of Al, Sc, Ti, V, Cr, Mn, Fe, Co, Ni, Cu, Zn, Ga, Ge, Zr, In, Sn, Y, Gd, Tb, Dy, Ho, Er, Tm, Yb, Lu, W, Bi, Th, and alkali earth metals is formed, and the inner layer 1 of the precursor of the polishing material is formed mainly composing the basic carbonate of the element. Consequently the urea compound is able to gradually hydrolyze and the precipitate is slowly generated. Therefore, an even precipitate can be obtained.

According to the present embodiment, regarding the composition ratio between the yttrium and the cerium in the reaction solution in the outer layer forming step B, by adding the aqueous solution at a certain rate, the change in the composition of the reaction solution as shown in FIG. 3 can be obtained, however, the present invention is not limited to the above. The outer layer 2 is to be formed so that the composition change of the reaction solution in the outer layer forming step B is successively changed, and the adding rate and the adding time can be suitably changed according to the target particle size, etc. of the polishing material particle. In FIG. 3, the aqueous solution is continuously added after the composition change caused by adding the aqueous solution including the yttrium and the cerium in the reaction solution substantially ends. Alternatively, the adding of the aqueous solution can be terminated when the composition ratio of yttrium and cerium included in the aqueous solution comes close to the composition of the reaction solution, and the reaction can be ended. According to the examples, the reaction of the inner layer forming step A is started by heating and mixing the aqueous solution prepared with yttrium nitrate and urea. However, the above can be prepared as a separate aqueous solution with a predetermined concentration and then blended, and heated and mixed to start the reaction.

INDUSTRIAL APPLICABILITY

The present invention can be used in the field of performing polishing with a polishing material containing cerium oxide in the process of producing, for example, glass products, semiconductor devices, and crystal oscillators.

REFERENCE NUMERAL LIST 1 inner layer
2 outer layer
A inner layer forming step
B outer layer forming step
C solid-liquid separation step
D baking step

The invention claimed is:
1. A production method for polishing material particles, the method comprising:
forming a salt of at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals and forming an inner layer of a precursor of the polishing material particle mainly composing the salt of the element;
adding for a predetermined amount of time an aqueous solution prepared with the salt of at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals and a salt of Ce in a reaction solution in which the salt of the element formed in the inner layer forming is dispersed, and forming an outer layer of the precursor of the polishing material particle on an outer side of the inner layer, the outer layer including a salt of at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals, and a salt of Ce;

separating the precursor of the polishing material particle with the outer layer formed in the outer layer forming from the reaction solution; and baking the precursor of the polishing material particle obtained in the separating in the air or in an oxidizing atmosphere, wherein, the reaction solution which forms a surface of the precursor of the polishing material particle in the outer layer forming includes at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals, and a percentage of Ce being 60 mol % or more and 81 mol % or less with respect to a total amount of the at least one element and Ce in the reaction solution, and the total amount of the concentration of the at least one element and Ce in the reaction solution is 1.17 to 50.33 mmol/L.

2. The production method for polishing material particles of claim 1, wherein, the salt formed in the inner layer forming and the outer layer forming is a basic carbonate.

3. The production method for polishing material particles of claim 2, wherein, in the inner layer forming, an aqueous solution prepared with a salt of at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals, and an urea compound are mixed, a basic carbonate of at least one element selected from the group consisting of Al, Sc, Ti, V, Cr, Mn, Fe, Co, Ni, Cu, Zn, Ga, Ge, Zr, In, Sn, Y, Lu, W, Bi, Th, and alkali earth metals is formed, and the inner layer of the precursor of the polishing material particle mainly composed of the basic carbonate of the element is formed.

\* \* \* \* \*